United States Patent
Ebert

(10) Patent No.: US 9,224,082 B2
(45) Date of Patent: Dec. 29, 2015

(54) COMBINATION OF LUMINESCENT SUBSTANCES

(75) Inventor: Dieter Ebert, Gottlieben (DE)

(73) Assignee: SWISS AUTHENTICATION RESEARCH AND DEVELOPMENT AG, Tagerwilen (CH)

(*) Notice: Subject to any disclaimer, the term of this patent is extended or adjusted under 35 U.S.C. 154(b) by 346 days.

(21) Appl. No.: 13/697,398

(22) PCT Filed: May 10, 2011

(86) PCT No.: PCT/EP2011/057528
§ 371 (c)(1),
(2), (4) Date: Nov. 29, 2012

(87) PCT Pub. No.: WO2011/141467
PCT Pub. Date: Nov. 17, 2011

(65) Prior Publication Data
US 2013/0062537 A1    Mar. 14, 2013

(30) Foreign Application Priority Data
May 10, 2010  (DE) .................... 10 2010 028 818

(51) Int. Cl.
*G06K 19/06* (2006.01)
(52) U.S. Cl.
CPC *G06K 19/06009* (2013.01); *G06K 2019/06225* (2013.01)
(58) Field of Classification Search
CPC ............... G06K 19/06009; G06K 2019/06225
USPC .................. 250/486.1, 458.1, 459.1
See application file for complete search history.

(56) References Cited

U.S. PATENT DOCUMENTS

| 6,686,074 B2 | 2/2004 | Muth et al. |
| 6,802,992 B1 | 10/2004 | Wieczoreck et al. |
| 6,981,648 B1* | 1/2006 | Inaba et al. .................... 235/488 |
| 7,057,712 B2* | 6/2006 | Beck et al. ........................ 356/72 |
| 2004/0079800 A1 | 4/2004 | Sugino et al. |
| 2009/0309044 A1* | 12/2009 | Ebert et al. ................. 250/459.1 |
| 2011/0018252 A1* | 1/2011 | Petry et al. ...................... 283/72 |
| 2012/0224353 A1 | 9/2012 | Winkler et al. |

FOREIGN PATENT DOCUMENTS

| EP | 1346839 A2 | 9/2003 |
| GB | 2258659 A | 2/1993 |
| JP | 9052479 A | 2/1997 |
| WO | 00/60527 A1 | 10/2000 |
| WO | 2008/000461 A2 | 1/2008 |
| WO | WO 2009/071167 A2 * | 6/2009 |
| WO | 2009/136921 A1 | 11/2009 |

OTHER PUBLICATIONS

Office Action issued for the corresponding DE 10 2010 028 818.7 application dated Apr. 4, 2013, 5 pgs.

* cited by examiner

*Primary Examiner* — David Porta
*Assistant Examiner* — Mindy Vu
(74) *Attorney, Agent, or Firm* — Rothwell, Figg, Ernst & Manbeck PC

(57) ABSTRACT

The invention relates to a luminescent composition comprising a component which can be excited by infrared (IR) radiation and a component which can be excited by ultraviolet (UV) radiation. The composition has a characteristic emission spectrum and may optionally be used together with a reading system adapted to the emission spectrum in order to mark substances or mixtures of substances.

40 Claims, 1 Drawing Sheet

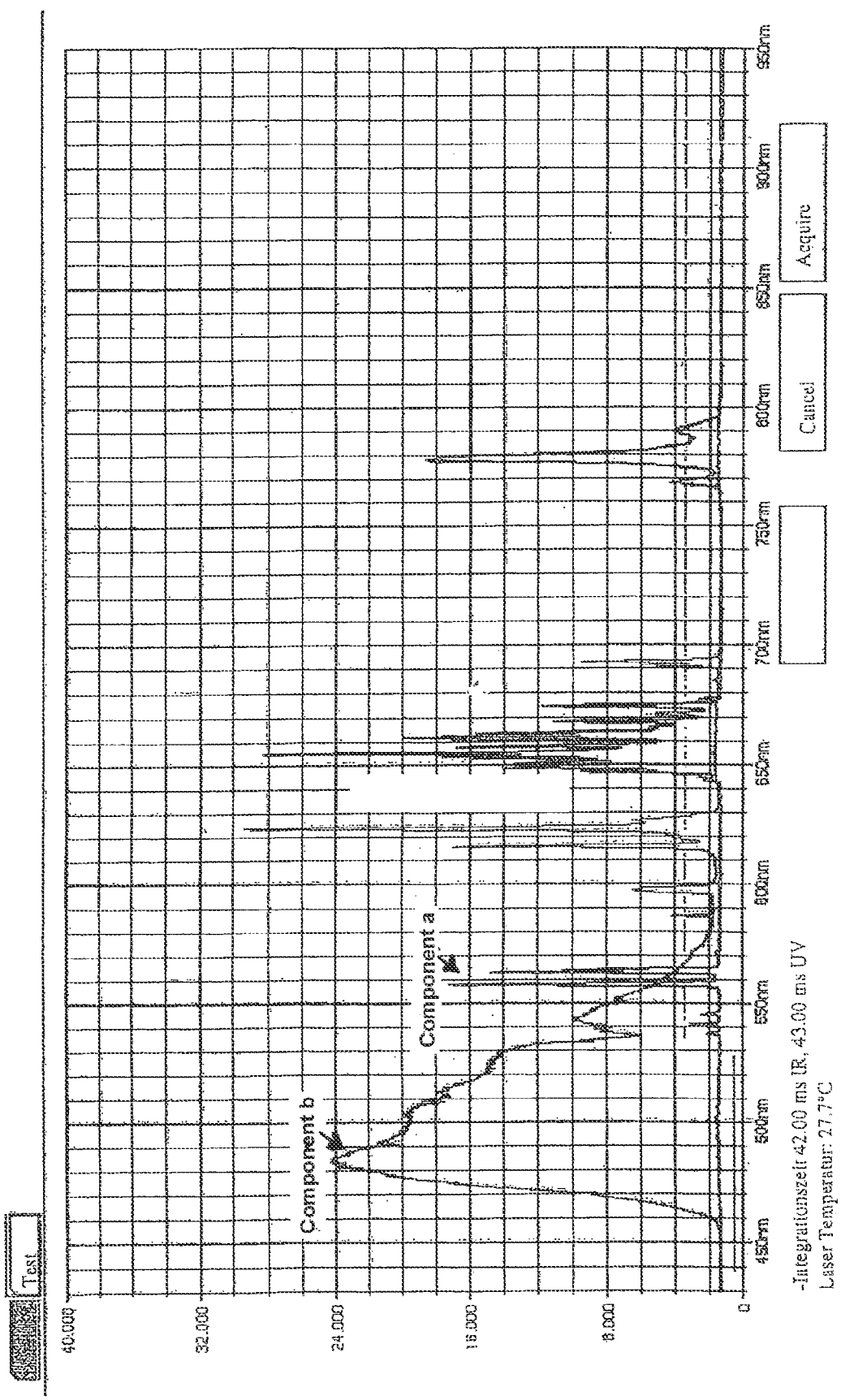

COMBINATION OF LUMINESCENT SUBSTANCES

CROSS REFERENCE TO RELATED APPLICATION

This application is a 35 U.S.C. 371 National Phase Entry Application from PCT/EP2011/057528, filed May 10, 2011, which claims the benefit of German Patent Application No. 10 2010 028 818.7 filed on May 5, 2010, the disclosure of which is incorporated herein its entirety by reference.

The invention relates to a luminescent composition comprising a component which can be excited by infrared (IR) radiation and a component which can be excited by ultraviolet (UV) radiation. The composition has a characteristic emission spectrum and may optionally be used together with a reading system which is adapted to the emission spectrum in order to label substances or mixtures of substances.

Compounds which comprise lanthanoid ions in the oxidation state +3 are often luminescent substances which emit shorter wavelength light, for example in the visible range and/or in the UV range, when excited with radiation in the infrared range. That property which is referred to as "upconversion" or "anti-Stokes fluorescence" may be attributed to the fact that electrons of the 4f shell of lanthanoid ions are raised, in the event of irradiation by sequential multiple excitation, to an energy state which has a level increased with respect to the absorption of a single photon. An energy-richer photon than the originally absorbed photon can be emitted from this energy state in the event of relaxation.

The use of lanthanoid oxide sulphides as anti-Stokes luminescent substances is described, for example, in WO 00/60527, WO 2008/000461 and in U.S. Pat. Nos. 6,802,992 and 6,686,074. It is further known to use those lanthanoid oxide sulphides to label substances or mixtures of substances.

According to the present invention, novel luminescent compositions are provided which comprise two components (a) and (b) which can be excited in different wavelength ranges. Component (a) is a component which can be excited by IR radiation and which comprises an oxide, oxide sulphide or oxide fluoride of lanthanoid ions. Component (b) is a component which can be excited by UV radiation and which is advantageously an inorganic compound which is inert under ambient conditions, for example, an optionally doped aluminate, which absorbs in the UV wavelength range and emits a luminescence radiation which is characteristic of the compound, for example, fluorescence radiation.

Consequently, the invention relates to a luminescent composition comprising
(a) a component which can be excited by IR radiation and which comprises at least one oxide, oxide sulphide or oxide fluoride of lanthanoid ions and
(b) a component which can be excited by UV radiation.

Component (a) of the composition is preferably a luminescent substance having "upconverter" and/or "anti-Stokes" properties. The component (a) preferably comprises an oxide, oxide sulphide or oxide fluoride of yttrium and an oxide, oxide sulphide or oxide fluoride of at least one, at least two or at least three additional elements selected from lanthanum, cerium, praseodymium, neodymium, samarium, europium, gadolinium, terbium, dysprosium, holmium, erbium, thulium, ytterbium and lutetium and optionally at least one dopant selected from oxides and/or fluorides of main or auxiliary group elements. For example, component (a) is a luminescent substance as described in WO 2008/000461, reference to the disclosure of which is expressly made hereby.

In the entire component (a), the oxide, oxide sulphide or oxide fluoride of yttrium is preferably present in a proportion of ≥85 mol %, ≥90 mol %, ≥92 mol %, ≥94 mol % or ≥96 mol %. Additional oxides, oxide sulphides or oxide fluorides are preferably present in a proportion of up to 5 mol %, up to 3.5 mol % or up to 2 mol % based on the total component (a). The additional oxides, oxide sulphides or oxide fluorides are preferably selected from the oxides, oxide sulphides or oxide fluorides of erbium, ytterbium and of at least one additional element, in particular lutetium, gadolinium, holmium, thulium, dysprosium and/or europium. The oxides, oxide sulphides or oxide fluorides of erbium and ytterbium are preferably present in a proportion of from 0.5 to 2 mol %, particularly preferably of from 1 to 2 mol %, based on the total component (a). The additional oxides, oxide sulphides or oxide fluorides are preferably used in smaller proportions of for example, from 0.1 to 1 mol %, particularly preferably from 0.1 to 0.5 mol % based on the total component (a).

For example, the component (a) of the composition may comprise, in addition to the oxide, oxide sulphide or oxide fluoride of yttrium, oxides, oxide sulphides or oxide fluorides of 1, 2, 3, 4, 5, 6, 7 or even more additional elements:

Component (a) of the composition according to the invention further comprises at least one dopant selected from oxides and/or fluorides of main or auxiliary group elements. The dopants are preferably present in each case in a proportion of up to 5 mol %, particularly preferably of up to 2 mol %, even more preferably of up to 1 mol %, even more preferably from 0.05 to 1 mol % and most preferably from 0.1 to 0.2 mol % based on the total component (a).

A preferred dopant is a fluoride which can be used, for example, as an alkaline earth metal fluoride or as an alkali metal fluoride, for example as potassium fluoride. The fluoride is preferably present in a proportion of from 0.1 to 0.2 mol % based on the total component (a).

Other preferred dopants are alkaline earth metals and/or auxiliary group elements which are present as cations having two or even more positive charges, preferably in the form of oxides and/or fluorides. Particularly preferred dopants are calcium, zinc and/or titanium, for example in the form of the oxides calcium oxide, zinc oxide or titanium dioxide. The cationic dopants are in each case preferably present in a proportion of from 0.1 to 0.2 mol % based on the total component (a).

The IR excitable component (a) of the luminescent composition is distinguished, on the one hand, by high luminescence intensity and, on the other hand, by emission lines and peaks which are characteristic of the presence and the proportions of the individual proportions. Thus, a virtually unlimited number of different emission spectra can be produced by specific combinations of oxides, oxide sulphides or oxide fluorides with dopants.

Component (a) of the composition according to the invention can be produced as described in WO 2008/000461. The addition of dopants, for example polyvalent cations and/or fluoride, brings about drastic changes in the position and/or intensity of individual emission wavelengths. Furthermore, a large increase in the total luminescence intensity is also found. It is assumed that a three-photon absorption also takes place in addition to the two-photon absorption known for anti-Stokes materials.

Component (b) of the composition according to the invention is a component which can be excited by UV radiation and which emits a characteristic is luminescence radiation after excitation. This preferably involves an aluminate which may be doped with transition metal and/or lanthanoid ions. Component (b) preferably comprises an aluminate of alkaline earth metal ions, transition metal ions and/or lanthanoid ions, preferably an aluminate of barium or magnesium or an aluminate of yttrium, optionally doped with Eu, Mn, Th and/or Cr ions. By adjusting the stoichiometry of alkaline earth metal, transition metal and/or lanthanoid ions in the aluminate, the position and/or intensity of the emission wavelengths can be varied. The UV sensitivity is increased by doping with transition metal ions and/or lanthanoid ions. The dopant of component (b) is advantageously present in a proportion of up to 10 mol %, up to 5 mol % or up to 1 mol % based on the total component (b).

The component (b) is advantageously present in a total proportion of from 1 to 30%, from 5 to 20% or from 8 to 12% based on the total weight of the components (a) and (b).

The components (a) and/or (b) are preferably present in the luminescent composition according to the invention in crystalline form. It is further preferable for the individual components to consist of a single phase, for preferable for the individual components to consist of a single phase, for example a crystalline phase, which can be determined by X-ray diffractometer methods. In a particularly preferable manner, the component (a) is present in a hexagonal crystalline form. The individual components (a) and/or (b) may also optionally consist of an admixture of a plurality of luminescent substances.

The composition is generally present in the form of particles, the mean particle size being ≥5 nm, in particular ≥1 nm. The particle size is preferably in the range from 50 nm to 100 µm, preferably from 50 nm to 50 µm and particularly preferably from approximately 100 nm to 10 µm.

The components (a) and (b) are present in the composition preferably in a substantially homogeneous distribution, for example, as a homogeneous distribution of particles, in particular of crystalline particles as previously described. That homogeneous distribution may be obtained by grinding the components together in conventional grinding devices, for example, ball mills.

The luminescent substances according to the invention can be used as identification and labelling substances, for example as security markings for substances or mixtures of substances. The authenticity of products or documents can thereby be determined. The luminescent substance may, since it is chemically inert, be introduced into any solid and/or liquid substances or mixtures of substances or be applied thereto. For example, the luminescent substance may be applied to or introduced into carrier substances such as, for example, paints, toners, inks, dyes, et cetera, or into products such as plastics materials, metals, glass, silicones, paper, rubber, medicaments, et cetera. Thus, for example, objects can be provided with a coating of the luminescent substance on the surface thereof or portions thereof which have a layer thickness of, for example, from 1 to 10 µm, preferably from 1 to 5 µm. The luminescent substance is preferably added to the product or a portion of the product in a proportion of from 20 to 2000 to the invention is also suitable for use in biological systems, for example cell cultures, samples of body fluids or tissue sections or as a contrast medium. The luminescent substance can be coupled to biological identification reagents in nanoparticle or microparticle form. Furthermore, the surfaces of particles of the luminescent substance can be modified with deodetomines or other bonding substances in order to improve the suspension properties, for example, in organic fluids such as, for example, oils, benzines, liquid gases, et cetera, in aqueous fluids such as, for example, body fluids, in aqueous organic fluid systems and flowable powders such as, for instance, toners. The smaller the particles, the lower their inclination towards sedimentation. For example, the particle size can be reduced by intensive milling to such an extent, for example to ≤100 nm, that a stable suspension of the particles in fluids is achieved even without the addition of bonding substances.

A forgery-protection means of the labelling is provided in that the emission lines characteristic of the respective luminescent substance constitute a cryptographic key which can be identified with a detector, i.e. the lock, adapted to the respective substance.

The composition according to the invention comprises two components which can be excited to luminescence by radiation in different wavelength ranges. The component (a) can preferably be excited to luminescence with IR radiation in the range from 850 to 1500 nm, in particular from 920 to 1000 nm, and/or the component (b) can be excited to luminescence with UV radiation in the range from 350 to 420 nm, in particular from 380 to 410 nm.

The identification of the presence of the luminescent substance in an object is brought about by irradiation with two wavelengths. In order to excite the component (a), a first wavelength is used in the infrared range, in particular with IR monocoherent laser light or with an IR light-emitting diode having wavelengths between approximately 850 nm and 1500 nm, preferably between approximately 920 nm and 1000 nm, particularly preferably between approximately 950 nm and 1000 nm, most preferably between 920 nm and 985 nm, the component (a) being excited and the resultant emission radiation being identified, for example, in the range between 300 nm and 1700 nm, in particular between 350 nm and 1000 nm. The component (a) is preferably irradiated at a power of from 1 to 200 mW, in particular from 10 to 80 mW.

In order to excite the component (b), a second wavelength is used in the UV range, in particular with UV monocoherent laser light or with a UV light-emitting diode having wavelengths between approximately 350 nm and 450 nm, preferably between approximately 380 nm and 400 nm, the component (b) being excited and the emission radiation being identified by, for example, fluorescence in the range between 300 nm and 1700 nm, in particular between 350 nm and 1000 nm. The component (b) is preferably irradiated at a power of from 2 to 50 mW, in particular from 5 to 30 mW.

It is preferable for the components (a) and (b) of the composition in each case to be excited to luminescence separately by irradiation at a wavelength in the IR range and by irradiation at a wavelength in the UV range and for the emission radiation of the components (a) and (b) to be identified separately. To that end, the excitation of component (a) and component (b) may be carried out sequentially, that is to say, at different times, the component (a) preferably being excited first and component (b) being excited subsequently.

In a preferred embodiment of the invention, the emission radiation of the components (a) and (b) can be identified digitally. Digitised signals of the signals originating from the components (a) and (b) or portions of those signals (for example, signals of individual peaks) can be converted into a new signal by cryptographic means using suitable algorithms. The data density can be increased by a factor of up to approximately 104 by combining those signals originating from two different components.

The invention further relates to a reading system for identifying a luminescent marking in a substance or mixture of substances comprising:
(i) a first radiation source in the IR range,
(ii) a second radiation source in the UV range,
(iii) optionally a contact sensor for activating the first and second radiation source in the event of contact of the reading system with a substance or mixture of substances and
(iv) at least one optical detection element for selectively identifying specific emission lines or luminescent marking.

The first and second radiation sources are preferably an IR laser and a UV laser, respectively. The reading system preferably further comprises a contact sensor, for example an optical contact sensor, which controls the first and second radiation sources so that the radiation source is activated only in the event of contact of the reading system with a sample which is to be determined. The irradiation of the product containing the luminescent substance by means of the reading system may be carried out directly with an optical waveguide or another optically relevant transfer medium, for example an optical solid state body, a fluid, gas, et cetera. The detection may be carried out visually or by means of detectors.

It is possible to use, for example, optical waveguides, the heads of which are ground as collecting lenses so that incident light (IR or UV light) and light emitted by the luminescent substance (specific emission spectrum) form one unit and can be focused at the same point. An advantage is that mechanical maladjustment cannot take place between the receiver and transmitter. The damping factor of the optical waveguide, for example comprising glass or plastics material, may vary, the transition from the optical structural elements (radiation source or detection element) to the optical waveguide being arranged so as to be low in covision. The length of the optical waveguide may vary and is typically between 1 cm and 50 cm.

The reading system further comprises one or more optical detection elements which are provided for selectively identifying specific emission lines of the luminescent substance, for example with regard to the wavelength and/or intensity, The detection elements may be, for example, diodes, photoelectric cells or electronic detectors. Detector matrixes having a plurality of preferably differently adjusted detectors are preferably used, for example diode matrixes, photoelectric cell matrixes or CCD matrixes. The detectors or individual detectors of the detector matrix can be combined with a spectrometer and/or optical filters, for example bandpass filters.

The reading system may further optionally comprise a programmable electronic unit which allows digital evaluation and preparation of the measurement signal.

The reading system according to the invention is advantageously used in conjunction with a luminescent composition which comprises two components (a) and (b) as previously described.

The invention further relates to a method for identifying a luminescent labelling in a substance or mixture of substances comprising the steps of:
(a) providing a substance or mixture of substances which is to be tested for the presence of a luminescent labelling, in particular a luminescent composition comprising the components (a) and (b) as previously described,
(b) irradiating the substance or mixture of substances with a first radiation source in the IR range and a second radiation source in the UV range in order to produce emission radiation of IR and UV-excitable components of the luminescent marking,
(c) separately identifying the emission radiations produced and
(d) determining a measurement signal from the identified emission radiations or a signal obtained therefrom by cryptographic means and optionally comparing the signal with a predetermined pattern.

In step (b), the irradiation in the IR range is preferably carried out first and the irradiation in the UV range is carried out subsequently. Step (d) preferably comprises digital preparation of the measurement signal or portions thereof.

The FIGURE shows the spectrum of a luminescent composition according to the invention. The emission lines originating from component (a) are indicated in white whereas emission lines originating from component (b) are indicated in blue. A new signal which ensures a very high level of verification reliability can be produced by means of cryptographic methods by digitally combining the individual signals or portions thereof.

The invention claimed is:

1. A luminescent composition consisting of:
   (a) a component which can be excited by IR radiation and which comprises at least one oxide, oxide sulphide or oxide fluoride of lanthanoid ions, and
   (b) a component which can be excited by UV radiation,
   wherein components (a) and/or (b) are present in crystalline form.

2. The luminescent composition according to claim 1, wherein component (a) comprises:
   an oxide, oxide sulphide or oxide fluoride of yttrium and
   an oxide, oxide sulphide or oxide fluoride of at least one, at least two or at least three additional elements selected from lanthanum, cerium, praseodymium, neodymium, samarium, europium, gadolinium, terbium, dysprosium, holmium, erbium, thulium, ytterbium and lutetium, and
   optionally, at least one dopant selected from oxides and/or fluorides of main or auxiliary group elements.

3. The luminescent composition according to claim 2, wherein the oxide, oxide sulphide or oxide fluoride of yttrium is present in a proportion of ≥85 mol % or ≥90 mol % based on the total component (a).

4. The luminescent composition according to claim 2, wherein the additional oxides, oxide sulphides or oxide fluorides are present in a proportion of up to 5 mol % up to 3.5 mol % or up to 2 mol % based on the total component (a).

5. The luminescent composition according to claim 2, wherein the additional oxides, oxide sulphides or oxide fluorides are selected from oxide sulphides or oxide fluorides of erbium, ytterbium and of at least one additional element, selected from lutetium, gadolinium, holmium, thulium, dysprosium and/or europium.

6. The luminescent composition according to claim 2, wherein the composition comprises a fluoride as dopant.

7. The luminescent composition according to claim 2, wherein the composition comprises an alkaline earth metal and/or an auxiliary group element as dopant.

8. The luminescent composition according to claim 7, wherein the alkaline earth metal and/or an auxiliary group element is calcium, zinc, and/or titanium.

9. The luminescent composition according to claim 2, wherein the dopants are present in each case in a proportion of up to 1 mol % based on the total component (a).

10. The luminescent composition according to claim 1, wherein the component (b) comprises an aluminate, optionally doped with transition metal and/or lanthanoid ions.

11. The luminescent composition according to claim 10, wherein the component (b) comprises an aluminate of alkaline earth metal ions, transition metal ions and/or lanthanoid ions.

12. The luminescent composition according to claim 11, wherein:
   the component (b) comprises an aluminate of barium or magnesium or an aluminate of yttrium; and
   the aluminate is optionally doped with Eu, Mn, Th, and/or Cr ions.

13. The luminescent composition according to claim 1, wherein the component (b) is present in a weight proportion of from 1 to 30%, from 5 to 20% or from 8 to 12% based on the total weight of (a) and (b).

14. The luminescent composition according to claim 1, wherein the components (a) and (b) are present in the form of particles.

15. The luminescent composition according to claim 14, wherein the particles have a mean particle size of from 50 nm to 100 µm.

16. The luminescent composition according to claim 1, wherein:

the component (a) can be excited to luminescence with IR radiation in the range from 850 nm to 1500 nm, and/or the component (b) can be excited to luminescence with UV radiation in the range from 350 to 420 nm.

17. The luminescent composition according to claim 16, wherein:

the component (a) can be excited to luminescence with IR radiation in the range from 920 nm to 1000 nm; and/or the component (b) can be excited to luminescence with UV radiation in the range in particular from 380 nm to 410 nm.

18. The luminescent composition according to claim 1, introduced into or applied to a substance or a mixture of substances.

19. The luminescent composition according to claim 18, wherein it is contained in a proportion of from 10 to 2000 ppm in the substance or mixture of substances.

20. A method of labeling a substance or mixture of substances, comprising associating a luminescent composition according to claim 1 with the substance or mixtures of substances.

21. The method according to claim 20, wherein at least one luminescent composition in the form of an admixture or a pattern is introduced into or applied to the substance or the mixture of substances.

22. The method according to claim 20, further comprising the identification of the presence of a luminescent composition.

23. The method according to claim 20, wherein a luminescent composition having a characteristic emission spectrum is identified by a reading system adapted thereto.

24. The method according to claim 20, wherein the components (a) and (b) of the composition are in each case excited to luminescence separately by irradiation at a wavelength in the IR range and by irradiation at a wavelength in the UV range and the emission radiation of the components (a) and (b) is identified separately.

25. The method according to claim 24, wherein:

the component (a) is excited by irradiation at a wavelength in the range from approximately 850 nm to 1500 nm, and/or the component (b) is excited by irradiation at a wavelength in the range from 350 to 450 nm, in particular from 380 to 410 nm.

26. The method according to claim 25, wherein the component (a) is excited by irradiation at a wavelength in the range from approximately 920 nm to 1000 nm.

27. The method according to claim 24, wherein the emission radiation is identified in a range from 300 to 1700 nm.

28. The method according to claim 27, wherein the emission radiation is identified in a range from 350 nm to 1000 nm.

29. The method according to claim 24, wherein:

the component (a) is excited by irradiation with an IR laser, and/or the component (b) is excited by irradiation with a UV laser.

30. The method according to claim 29, wherein:

the component (a) is excited by irradiation with an IR laser having a power of from 10 mW to 100 mW; and/or the component (b) is excited by irradiation with a UV laser having a power of from 5 mW to 30 mW.

31. The method according to claim 24, wherein the irradiation of the component (a) and component (b) is carried out sequentially.

32. The method according to claim 31, wherein the component (a) is irradiated first and the component (b) irradiated subsequently.

33. The method according to claim 24, wherein the emission radiation of the components (a) and (b) is identified digitally.

34. The method according to claim 33, wherein digitised signals of the signals originating from the components (a) and (b) or portions thereof are converted into a new signal by cryptographic means.

35. A method for identifying a luminescent marking in a substance or mixture of substances comprising the steps of:

(a) providing a substance or mixture of substances which is to be tested for the presence of a luminescent composition according to claim 1, (b) irradiating the substance or mixture of substances with a first radiation source in the IR range and a second radiation source in the UV range in order to produce emission radiation of IR and UV-excitable components of the luminescent marking, (c) separately identifying the emission radiations produced and (d) determining a measurement signal from the identified emission radiations or a signal obtained therefrom by cryptographic means and optionally comparing the signal with a predetermined pattern.

36. A substance or mixture of substances into or to which a luminescent composition according to claim 1 is introduced or applied.

37. A reading system for identifying a luminescent marking in a substance or mixture of substances comprising:

(i) a first radiation source in the IR range, (ii) a second radiation source in the UV range, (iii) optionally a contact sensor for activating the first and second radiation source in the event of contact of the reading system with a substance or mixture of substances and (iv) at least one optical detection element for selectively identifying specific emission lines or luminescent marking, wherein the reading system is used in conjunction with at least one luminescent composition comprising:

(a) a component which can be excited by IR radiation and which comprises at least one oxide, oxide sulphide or oxide fluoride of lanthanoid ions, and (b) a component which can be excited by UV radiation.

38. The reading system according to claim 37, wherein the detection element comprises a CCD module coupled to a spectrometer.

39. A luminescent composition comprising:

(a) a component which can be excited by IR radiation and which comprises at least one oxide, oxide sulphide, or oxide fluoride of lanthanoid ions; and (b) a component which can be excited by UV radiation;

wherein the component (b) comprises an aluminate doped with transition metal and/or lanthanoid ions.

40. A luminescent composition comprising:

(a) a component which can be excited by IR radiation and which comprises at least one oxide, oxide sulphide, or oxide fluoride of lanthanoid ions; and (b) a component which can be excited by UV radiation;

wherein the component (b) is present in a weight proportion of from 1 to 30% based on the total weight of (a) and (b).

* * * * *